US012442242B2

(12) United States Patent
Dawtrey

(10) Patent No.: US 12,442,242 B2
(45) Date of Patent: Oct. 14, 2025

(54) SYSTEM AND METHOD FOR WIRELESS DOOR CONTROL

(71) Applicant: Jason Dawtrey, Ayr (CA)

(72) Inventor: Jason Dawtrey, Ayr (CA)

( * ) Notice: Subject to any disclaimer, the term of this patent is extended or adjusted under 35 U.S.C. 154(b) by 70 days.

(21) Appl. No.: 18/303,149

(22) Filed: Apr. 19, 2023

(65) Prior Publication Data

US 2024/0352783 A1 Oct. 24, 2024

(51) Int. Cl.

*E05F 15/77* (2015.01)
*G07C 9/00* (2020.01)
*E05B 47/00* (2006.01)

(52) U.S. Cl.

CPC .......... *E05F 15/77* (2015.01); *G07C 9/00309* (2013.01); *E05B 2047/0067* (2013.01)

(58) Field of Classification Search

CPC ......... E05B 2047/0067; G07C 9/00309; E05F 15/77
USPC .......... 340/5.7
See application file for complete search history.

(56) References Cited

U.S. PATENT DOCUMENTS 6,064,316 A * 5/2000 Glick .................. E05B 47/00 257/E29.081
6,486,793 B1 11/2002 Buccola
6,580,355 B1 * 6/2003 Milo .................. E05B 47/0012 70/277
6,784,784 B1 * 8/2004 Zehrung .................. E05B 45/06 340/545.7
8,690,205 B2 * 4/2014 Benitez .................. E05B 17/22 292/347
2004/0243812 A1 * 12/2004 Yui .................. G07C 9/00563 713/182
2006/0164208 A1 * 7/2006 Schaffzin .................. G07C 9/00182 340/686.2
2009/0025435 A1 * 1/2009 Popowski .................. E05B 47/06 70/91
2013/0090744 A1 * 4/2013 Tran .................. H04L 12/282 700/9
2014/0117782 A1 5/2014 Wignot et al.
2015/0116082 A1 4/2015 Cregg et al.
(Continued)

FOREIGN PATENT DOCUMENTS

CA 2539673 A1 4/2005
CA 2627110 A1 10/2009
(Continued)

*Primary Examiner* — Omar Casillashernandez
(74) *Attorney, Agent, or Firm* — Own Innovation Inc.; James W. Hinton

(57) ABSTRACT

A wireless washroom door control system is disclosed. The door control system comprises a wireless door controller, a touchless switch, an electric strike, a mechanical door opener, an administrative terminal and a touchless emergency button. The wireless door controller includes a power supply and a control module, wherein the control module includes a processor, a memory, a voice prompt module and a timing module. The system may also be used to monitor access to washrooms and provide voice prompts to assist users. The system may be used to retrofit existing washroom doors to provide a means for touchless opening and closing of the washroom door to aid persons with disabilities. A further advantage of the present system is reduced potential for transmission of bacteria or germs from door control surfaces.

18 Claims, 5 Drawing Sheets

(56) References Cited

U.S. PATENT DOCUMENTS

| | | | | |
|---|---|---|---|---|
| 2017/0002586 | A1 * | 1/2017 | Lee | E05B 39/00 |
| 2017/0191287 | A1 * | 7/2017 | Mittleman | E05F 15/72 |
| 2019/0354193 | A1 * | 11/2019 | Sawada | B60K 35/20 |
| 2020/0126392 | A1 * | 4/2020 | Witkowski | G08B 21/182 |
| 2022/0275960 | A1 * | 9/2022 | Cheng | H05B 47/16 |
| 2022/0319287 | A1 * | 10/2022 | Trapani | G08B 13/1609 |
| 2023/0047088 | A1 * | 2/2023 | Blasband | H04L 9/0897 |
| 2023/0119347 | A1 * | 4/2023 | Carpenter | G07C 9/00571 340/5.7 |

FOREIGN PATENT DOCUMENTS

| | | | |
|---|---|---|---|
| CA | 2552123 | C | 3/2012 |
| CN | 201383209 | Y | 1/2010 |
| CN | 105160850 | A | 12/2015 |

* cited by examiner

SYSTEM AND METHOD FOR WIRELESS DOOR CONTROL

TECHNICAL FIELD

The embodiments disclosed herein relate to door control systems, and, in particular to systems, methods, and devices for wireless door control.

INTRODUCTION

Existing washrooms often have accessible facilities for persons with physical disabilities, such as an automatic swing door operator, however most washrooms do not have accessible facilities for people with vision disorders.

Existing wired automatic door control systems include complicated wiring that entails significant work for replacement when it comes time for a retrofit. Furthermore, if the door control system malfunctions, it requires significant time and work to check and fix.

In most public buildings, there are often washrooms on each floor, with potentially dozens of washrooms throughout the building. A such, it is challenging for facility management to control and monitor access to all of the washrooms in real-time. For example, it may be advantageous for facility management to direct a user to a washroom that is known to be unoccupied based on monitoring access to the washroom.

Accordingly, there is a need for improved door control systems and methods to address the above-mentioned problems.

SUMMARY

An objective of the present invention is to provide a wireless washroom door control system and a wireless washroom door control method. The door wireless control system comprises a touchless switch, a wireless door controller, an electric strike and an emergency button. Wherein the wireless door controller includes a control module and a mechanical door opener. It is necessary to make retrofit to traditional washroom system for improving efficiency of facility management and reducing device wiring's cost.

According to some embodiments, there is a wireless door control system comprising: a wireless door controller including a control module configured for wirelessly controlling the opening and closing, locking and unlocking of the washroom door, and generating notification information relating to the status of the door; a power supply for providing power to the door control system; a touchless switch for transmitting a signal, via radio frequency, to the control module in response to being triggered by a user command; an electric strike for unlocking the washroom door, wherein the electric strike is connected to the power supply, and wherein the electric strike connects to the control module via radio frequency; a mechanical door opener for opening the washroom door, wherein the mechanical door opener is connected to the power supply; and an administrative terminal for receiving the notification information generated by the control module, wherein the administrative terminal is connected to the control module over a Wi-Fi network. The wireless door control system further comprises a touchless emergency button installed on an interior wall of the washroom.

The wireless door controller further comprises: a processor for executing processor-executable instructions to cause the door to open and close, lock and unlock according to signals received from the touchless switch or touchless emergency button; a memory for storing processor-executable instructions, a pre-set duration and a recorded voice prompt; a voice prompt module for playing the recorded voice prompt; a timing module for timing the locking duration.

According to some embodiments, there is a wireless door controller including a control module configured for wirelessly controlling the opening and closing, locking and unlocking of a washroom door, and generating notification information relating to the status of the door; and a power supply for providing power to an electric strike and a mechanical door opener, wherein the output of the power supply is controlled by the control module; wherein the wireless door controller is connected to the electric strike and the mechanical door opener via radio frequency.

According to some embodiments, the notification information is sent as an email for reporting abnormal status to an administrative terminal when a locking duration surpasses a pre-set duration; alternatively the notification information is sent as an email for reporting an emergency situation to an administrative terminal when the wireless door controller receives an unlock request.

According an embodiment, there is a method for installing a wireless washroom door control system. The method comprises installing a touchless switch on an exterior wall surface adjacent to a washroom door; installing an electric strike within a door frame of the washroom door, wherein the electric strike is positioned within the door frame to interact with a mortise lock in the washroom door; installing a wireless door controller, including a mechanical door opener and a control module above a top of the door frame; and installing an emergency button on an interior wall surface adjacent to washroom facilities.

According to some embodiments, there is a method for touchless door control. The steps include receiving a lock status of a washroom door wireless door controller; timing a locking duration; judging whether the locking duration surpasses a pre-set duration; and transmitting notification information to an administrative terminal. The notification information may be sent as an email for reporting abnormal status to the administrative terminal when the locking duration surpasses the pre-set duration.

The method for door control further includes playing a recorded voice prompt to notify that the washroom door will be unlocked and unlocking the door according to a user command.

According to some embodiments, there is a method for door control during an emergency comprising: receiving an unlocking request from a touchless emergency button; playing a recorded voice prompt to notify that the washroom door will be unlocked; transmitting a command for unlocking the washroom door from a wireless door controller to a mechanical door opener; and transmitting notification information to an administrative terminal. The notification information is sent as an email for reporting an emergency situation to the administrative terminal when the unlocking request is received from the touchless emergency button.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Existing automatic door control systems are generally operated by a motor and motion sensors for opening and closing a door. The components of the door control system are typically connected by hard wires which are mounted on a ceiling or wall. When it comes to retrofitting components of the door control system, each modification requires significant time and effort to provide a new feature.

Figure 1:
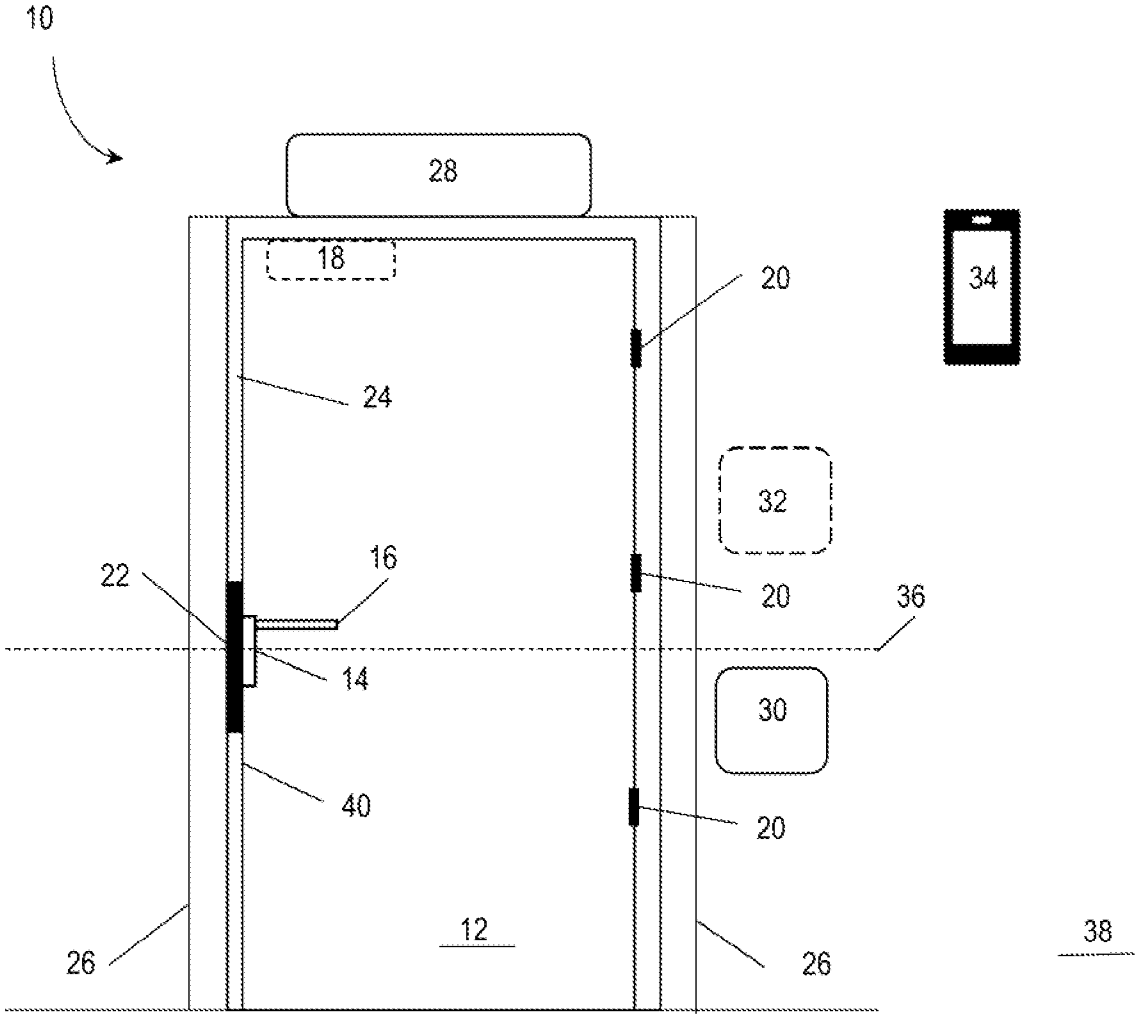
FIG. 1 is a block diagram of a door control system, according to an embodiment.

Referring to FIG. 1, illustrated therein is a door control system 10, in accordance with an embodiment.

The door control system 10 includes a door 12, a mortise lock 14, a handle 16, a mechanical door opener 18, three hinges 20, an electric strike 22, a door jamb 24, vertical door frames 26, a wireless door controller 28, a touchless switch 30, and an emergency button 32.

The door 12 is made of a hard-to-break substance, such as wood or metal. The door 12 is hinged along one side to allow the door 12 to pivot away from the door frame 26 in one direction, but not the other.

The mortise lock 14 is made of 304 stainless steel and installed along a horizontal axis 36 of the door 12 and adjacent to a vertical edge 40 of the door 12. The mortise lock 14 may be one that is opened and closed by mechanical or electrical means.

The handle 16 is attached to the mortise lock 14. The handle 16 may be turned by the application of force by a user whereby, the handle mechanically opens the mortise lock 14. Alternatively, the mortise lock 14 may be opened by the electric strike 22 as described below.

The mechanical door opener 18 is installed on the top of the door 12 and activated to open the door 12 by a wireless door controller 28. The mechanical door opener 18 may be a piston actuated arm, a motorized hinge arm, or the like, providing a means to transition the door 12 between an open and a closed position.

The three hinges 20 are made of iron and allow for the smooth opening or closing of the door 12. The hinges 20 connect the door 12 and the door jamb 24. The hinges 20 are biased to cause the door 12 to open in one direction only.

The electric strike 22 is a stainless-steel electromechanical device and installed into a nook (not shown) of the vertical door frame 26 and aligned to receive a latch of the mortise lock 14 and hold the latch secure until the release connection is activated. The electric strike 22 holds the latch securely, thereby locking the door 12, when power is supplied to the electric strike 22.

When power to the electric strike 22 is removed, and the release connection is activated, whereby a hinged piece of metal inside the electric strike 22 will pivot to open the mortise lock 14 and allow the door 12 to open without the need for the door handle 16 being turned manually. This allows for the door 12 to be opened without the need for a user to apply force to the door. A further advantage of not having to physically contact the door 12 or handle 16 is this reduces the spread of bacteria and germs.

The door jamb 24 is connected to the vertical door frame 26 to bear the weight of the door 12 and maintain the operational durability and security of the door 12.

The wireless door controller 28 is a control hub connected communicatively to the mechanical door opener 18 and the electric strike 22 via electric pulse. The wireless door controller 28 is also communicatively connected to the touchless switch 30, and the emergency button 32 via radio frequency.

The wireless door controller 28 is wirelessly connected to an administrative terminal 34 via Wi-Fi network for delivering notification information to an administrator. The administrative terminal 34 may be a mobile phone, tablet, laptop or computer.

The touchless switch 30 is located on an exterior wall 38 adjacent to the door 12. The touchless switch 30 may have a antimicrobial coating that kills or repels unwanted microbes.

An advantage of the touchless switch 30 is to reduce the spread of bacteria and germs since the touchless switch 30 can be triggered without physically touching the touchless switch 30. A further advantage of the touchless switch 30 is to assist persons with disabilities to open the door 12 easily without applying physical force to the door 12. The touchless switch 30 may be triggered by, for example, a hand gesture.

The emergency button 32 is installed on an interior wall (i.e. the interior wall faces the interior of the washroom) adjacent to the door 12, wherein the interior wall is opposite the exterior wall 38. The emergency button 32 is touchless in the same manner as touchless switch 30 and may be triggered by, for example, a hand gesture. The emergency button 32 may be triggered to request assistance from a user during an emergency.

An advantage of the emergency button 32 is to reduce the spread of bacteria and germs since the emergency button 32 can be triggered without physically touching the emergency button 32. A further advantage of the emergency button 32 is to assist persons with disabilities to open the door 12 easily without applying physical force to the door 12 during an emergency.

Figure 2:
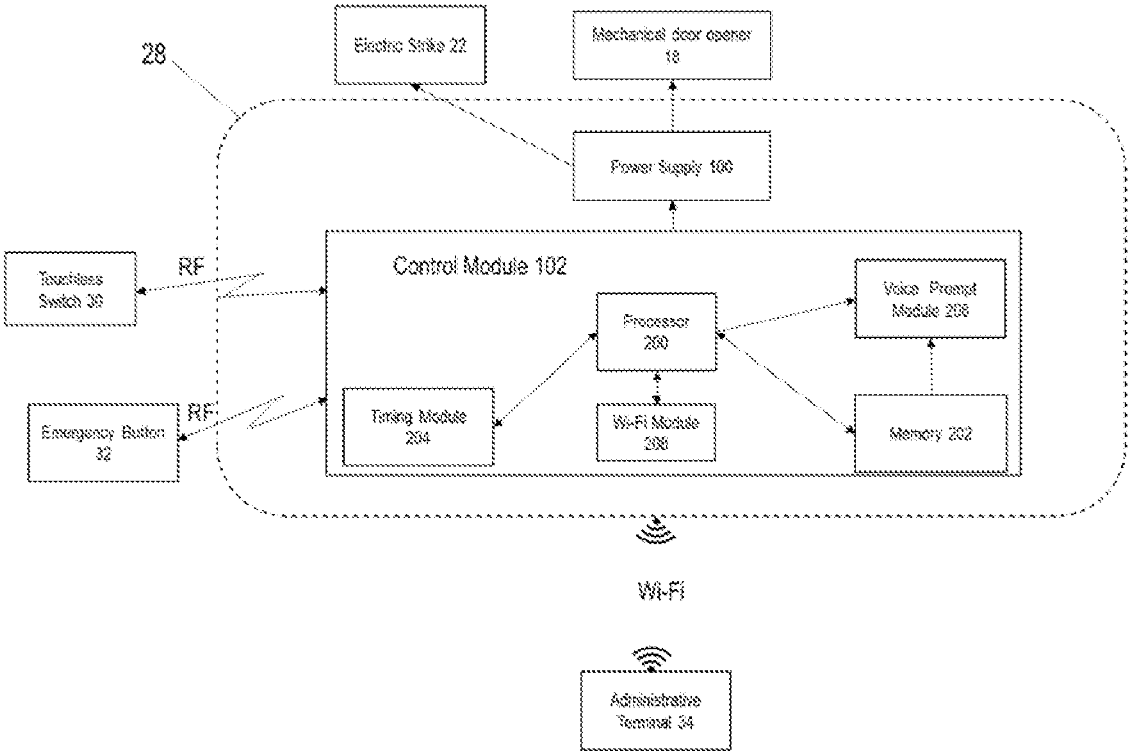
FIG. 2 is a block diagram of a control module, in accordance with an embodiment.

As shown in FIG. 2, illustrated therein is a block diagram of a control module 102, in accordance with an embodiment.

The power supply 100 provides electric power for the entire door control system (i.e. door control system 10 in FIG. 1).

The control module 102 is a programed circuit board configured to wirelessly and remotely control the opening and closing, locking and unlocking of the door (i.e. door 12 in FIG. 1) and is further configured for delivering notification information to the administrative terminal (i.e. administrative terminal 34 in FIG. 1).

The control module 102 communicates with the touchless switch 30 and the emergency button 32 via radio frequency and communicates with the administrative terminal via Wi-Fi network.

The control module 102 comprises a processor 200, a memory 202, a timing module 204 and a voice prompt module 206.

The processor 200 is configured to control door opening and closing, locking and unlocking according to signals received from the touchless switch 30 and the emergency button 32.

The processor 200 communicates with the touchless switch 30 and the emergency button 32 via radio frequency and communicates with the administrative terminal 34 via Wi-Fi network.

The memory 202 is configured to store a recorded voice prompt, a pre-set duration, and processor-executable instructions.

The timing module 204 is configured to time a locking duration when the door is locked.

The voice prompt module 206 is configured to play a recorded voice prompt when the door has been locked for longer than a pre-set locking duration.

The voice prompt module 206 is further configured to play a recorded voice prompt when the emergency button is triggered.

The Wi-Fi module 208 is configured to connect to a Wi-Fi network and transmit notification information to the administration terminal 34. The notification information may be in the form of an email, text message or audio message.

The Wi-Fi module 208 may be configured through a setup page. An administrator can access the setup page by entering a default IP address of the WI-FI module 208 in a web browser running on the administrator terminal 34. Via the setup page, an administrator may enter an email address or phone number to which notification information is sent.

The Wi-Fi module 208 is further configured to automatically scan for WIFI networks in the area that are broadcasting, for example, at 2.4 GHz.

Figure 3:
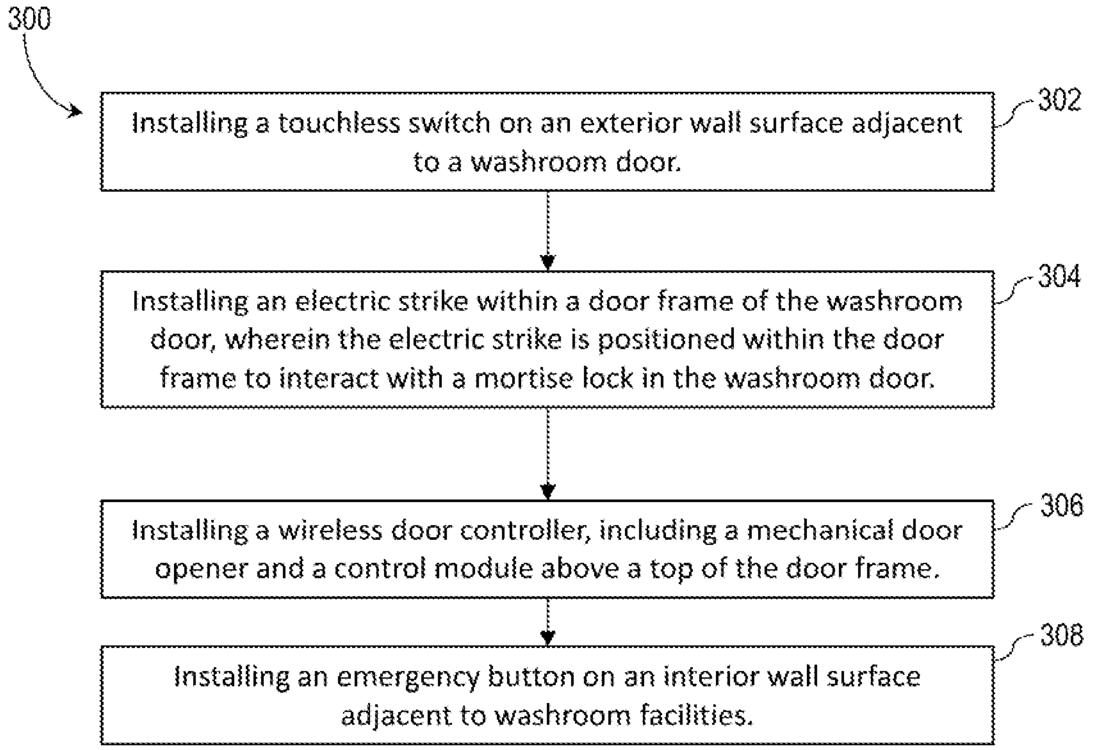
FIG. 3 is a flow chart of a method for installing for installing a washroom door wireless control system.

According to the present disclosure, FIG. 3 is a flow chart of a method 300 for installing a wireless washroom door control system, in accordance with an embodiment. The method 300 may be implemented to retrofit an existing washroom door. The method 300 may be implemented to install control system 10 in FIG. 1. For reference, the elements from FIG. 1 are identified in parenthesis.

At 302, a touchless switch (30) is installed on an exterior wall (38) surface adjacent to a washroom door (12).

The touchless switch (30) is connected to a wireless door controller (28) via radio frequency.

At 304, an electric strike (22) is installed within a door frame (26) of the washroom door (12), wherein the electric strike (22) is positioned within the vertical door frame (26) to operably interact with a mortise lock (14) in the washroom door (12). The electric strike (22) may be used to replace a bracket within the door frame that receives the latch from the mortise lock (14). The mortise lock (14) may already be present in the existing washroom door.

The electric strike (22) is aligned to receive a latch of the mortise lock 14 and hold the latch secure until power to the electric strike (22) is removed.

At 306, a wireless door controller (28) is installed including a mechanical door opener (18) and a control module above a top of the door frame (26).

The wireless door controller (28) is connected to the mechanical door opener (18) and the electric strike (22) via electric pulse. The wireless door controller (28) is also communicatively connected to the touchless switch (30), and the emergency button (32) via radio frequency.

The wireless door controller (28) is wirelessly connected to an administrative terminal (34) via Wi-Fi network for delivering notification information to an administrator.

At 308, an emergency button (32) is installed on an interior wall surface of the washroom.

The emergency button (32) is wireless connected to a wireless door controller (28) via radio frequency.

For simplicity, Acts 302, 304, 306 and 308 are shown in a particular sequence in FIG. 3. However, given the wireless connections between components of the door control system, Acts 302, 304, 306 and 308 may be performed in another sequence other than that shown in FIG. 3.

Figure 4:
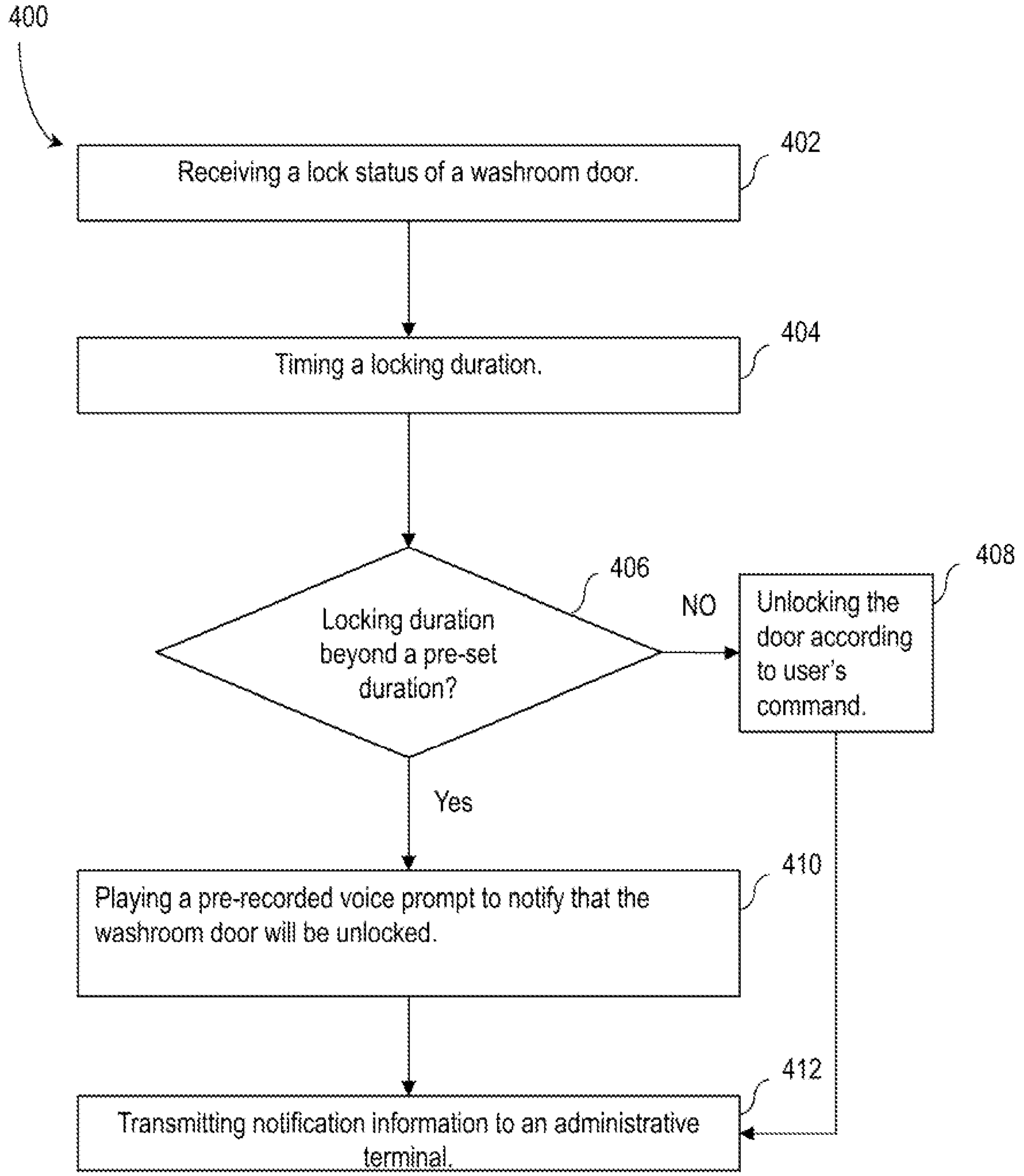
FIG. 4 is a flow chart of a method for door control, in accordance with an embodiment.

According to the present disclosure, FIG. 4 is a flow chart of a method 400 for door control, in accordance with an embodiment. The method 400 may be implemented using the control system 10 in FIG. 1 and wireless door controller 28 in FIG. 2. For reference, the elements from FIGS. 1 and 2 are identified in parenthesis.

At 402, a lock status of a washroom door (12) is received a wireless door controller (28).

When a user makes a hand gesture in front of the touchless switch (30) to open the washroom door (12), a signal for unlocking is transmitted from the touchless switch (30) to the wireless door controller (28) via radio frequency.

Then the control module (102) is received a signal to the power supply to remove the power to the electric strike (22) and supply power to the mechanical door opener (18).

The power supply (100) removes the power to the electric strike (22) to unlock the door (12) and supplies power to the mechanical door opener (18) to open the door (12).

At the same time, a lock status corresponding to the door (12) being opened is transmitted from the electric strike (22) to the wireless door controller (28). When the door (12) is closed thereafter, the lock status signal corresponding to the door (12) being closed is transmitted from the electric strike (22) to the wireless door controller (28).

At 404 a locking duration is timed. The locking duration is timed from the moment the door (12) is closed and locked. The locking duration is timed by the timing module (204).

The locking duration is timed for safety consideration.

At 406 the locking duration is compared to a pre-set duration. The pre-set duration is set by an administrator in advance, and the pre-set duration can be altered on the administrative terminal (34). Act 406 may be performed continuously in real-time or at pre-determined intervals from the commencement of the Act 404.

At 408, if the locking duration is judged to be within the pre-set duration, the washroom door (12) remains locked/closed and may be unlocked/opened "manually" by the user.

At 410 if the locking duration is judged to be longer than the pre-set duration, a recorded voice prompt is played to notify that the washroom door will be unlocked.

At 412 notification information is transmitted from the wireless control (28) to the administrative terminal (34) via Wi-Fi network.

The notification information may be an email, a text message or an audio message. The notification information includes, at least, the locking status, the locking duration, and the location of washroom.

Figure 5:
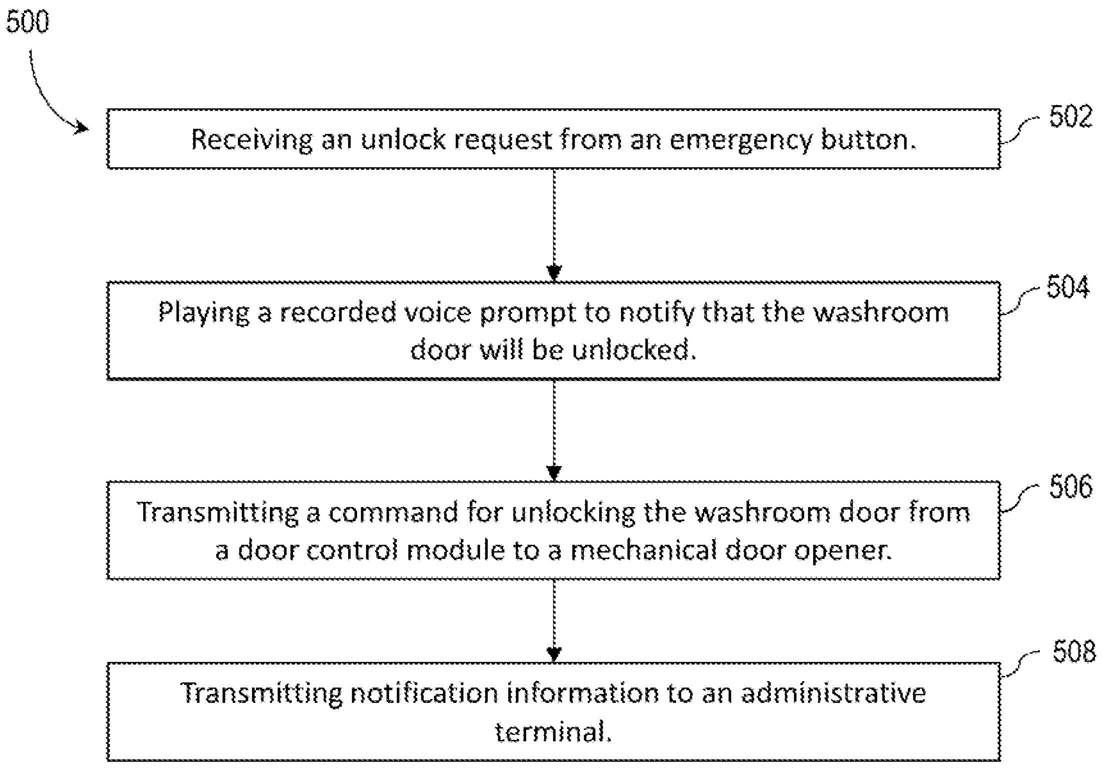
FIG. 5 is a flow chart of a method for door control during an emergency, in accordance with an embodiment.

Now referring to FIG. 5, illustrated therein is a flow chart of a method 500 for door control during an emergency situation, in accordance with an embodiment. The method 500 may be implemented using the control system 10 in FIG. 1 and wireless door controller 28 in FIG. 2. For reference, the elements from FIGS. 1 and 2 are identified in parenthesis.

At 502, an unlocking request is received by a control module (102).

The unlocking request is a signal generated by an emergency button (32) when the user makes a hand gesture in front of the emergency button (32).

At 504 a recorded voice prompt is played by a voice prompt module (206) to notify that the washroom door (12) will be unlocked.

Once receiving the unlocking request, the control module (102) transmits a command to the voice prompt module (206) for playing the recorded voice prompt.

At 506 a command for unlocking the washroom door (12) is transmitted from the control module (102) to the power supply (100). The control module (102) sends a signal to the power supply (100) to remove the power to the electric strike (22) and supply power to the mechanical door opener (18). The power supply (100) removes the power to the electric strike (22) to unlock the door (12) and supplies power to the mechanical door opener (18) to open the door (12).

At 508, notification information is transmitted to an administrative terminal (34) via Wi-Fi network.

The notification information may be in the form of an email, a text message or an audio message. The notification information includes the locking status, the locking duration, and the location of washroom at least.

While the above description provides examples of one or more apparatus, methods, or systems, it will be appreciated that other apparatus, methods, or systems may be within the scope of the claims as interpreted by one of skill in the art.

The invention claimed is:

1. A wireless washroom door control system, comprising:

a wireless door controller, comprising:

a control module configured for wirelessly controlling the opening and closing, locking and unlocking of the washroom door, and generating notification information relating to the status of the door, wherein the notification information is sent as an email for reporting abnormal status to the administrative terminal when a locking duration surpasses a pre-set duration; and a power supply for providing power to the door control system, wherein the output of the power supply is controlled by the control module;

a touchless switch for transmitting a signal, via radio frequency, to the control module in response to being triggered by a user command;

an electric strike for unlocking the washroom door, wherein the electric strike is connected to the power supply, and wherein the electric strike connects to the control module via radio frequency;

a mechanical door opener for opening the washroom door, wherein the mechanical door opener is connected to the power supply; and an administrative terminal for receiving the notification information generated by the control module, wherein the administrative terminal is connected to the control module over a Wi-Fi network.

2. The system of claim 1, wherein the notification information is sent as an email for reporting an emergency situation to the administrative terminal when the wireless door controller receives an unlock request.

3. The system of claim 1, wherein the notification information includes the locking status, the locking duration, and the location of washroom at least.

4. The system of claim 1, wherein the wireless door controller further comprises a processor configured to execute processor-executable instructions to cause the door to open and close, lock and unlock according to signals received from the touchless switch or a touchless emergency button.

5. The system of claim 1, wherein the wireless door controller further comprises a memory for storing processor-executable instructions, a pre-set duration and a recorded voice prompt.

6. The system of claim 1, wherein the wireless door controller further comprises a voice prompt module for playing the recorded voice prompt.

7. A wireless door controller, comprising:

a control module configured for wirelessly controlling the opening and closing, locking and unlocking of a washroom door, and generating notification information relating to the status of the door, wherein the notification information is sent as an email for reporting abnormal status to an administrative terminal when a locking duration surpasses a pre-set duration; and a power supply for providing power to an electric strike and a mechanical door opener, wherein the output of the power supply is controlled by the control module;

wherein the wireless door controller is connected to the electric strike and the mechanical door opener via radio frequency.

8. The wireless door controller of claim 7, wherein the notification information is sent as an email for reporting an emergency situation to an administrative terminal when the wireless door controller receives an unlock request.

9. The wireless door controller of claim 7, wherein the control module comprises a processor configured to execute processor-executable instructions to cause the door to open and close, lock and unlock according to signals received from a touchless switch or a touchless emergency button.

10. The wireless door controller of claim 7, wherein the control module further comprises a memory for storing processor-executable instructions, a pre-set duration and a recorded voice prompt.

11. The wireless door controller of claim 10, wherein the control module further comprises a voice prompt module for playing the recorded voice prompt.

12. The wireless door controller of claim 7, wherein the control module further comprises a timing module for timing a locking duration.

13. A method for installing a washroom door wireless control system, the method comprising:

wherein the washroom door wireless control system includes:

a wireless door controller, comprising:

a control module configured for wirelessly controlling the opening and closing, locking and unlocking of the washroom door, and generating notification information relating to the status of the door; and a power supply for providing power to the door control system, wherein the output of the power supply is controlled by the control module;

a touchless switch for transmitting a signal, via radio frequency, to the control module in response to being triggered by a user command;

an electric strike for unlocking the washroom door, wherein the electric strike is connected to the power supply, and wherein the electric strike connects to the control module via radio frequency;

a mechanical door opener for opening the washroom door, wherein the mechanical door opener is connected to the power supply; and an administrative terminal for receiving the notification information generated by the control module, wherein the administrative terminal is connected to the control module over a Wi-Fi network;

installing the touchless switch on an exterior wall surface adjacent to the washroom door;

installing the electric strike within a door frame of the washroom door, wherein the electric strike is positioned within the door frame to interact with a mortise lock in the washroom door;

installing the wireless door controller, including the mechanical door opener and a control module above a top of the door frame; and installing an emergency button on an interior wall surface adjacent to washroom facilities;

wherein the control module for is wirelessly connected to the touchless switch and the emergency button via radio frequency; and wherein the mechanical door opener receives signals wirelessly from the control module.

14. A method for door control using a wireless door controller, the method comprising:

wherein the wireless door controller includes:

a control module configured for wirelessly controlling the opening and closing, locking and unlocking of a washroom door, and generating notification information relating to the status of the door; and a power supply for providing power to an electric strike and a mechanical door opener, wherein the output of the power supply is controlled by the control module;

wherein the wireless door controller is connected to the electric strike and the mechanical door opener via radio frequency receiving a lock status of the washroom door wireless door controller;

timing a locking duration;

judging whether the locking duration surpasses a pre-set duration; and transmitting notification information to an administrative terminal.

15. The method of claim 14, further comprising playing a recorded voice prompt to notify that the washroom door will be unlocked.

16. The method of claim 14, wherein the notification information is sent as an email for reporting abnormal status to the administrative terminal when the locking duration surpasses the pre-set duration.

17. A method for door control during an emergency, comprising:

receiving an unlocking request from a touchless emergency button;

playing a recorded voice prompt to notify that the washroom door will be unlocked;

transmitting a command for unlocking the washroom door from a wireless door controller to a mechanical door opener; and transmitting notification information to an administrative terminal through an email for reporting abnormal status when the locking duration surpasses a pre-set duration.

18. The method of claim 17, wherein the notification information is sent as an email for reporting an emergency situation to the administrative terminal when the unlocking request is received from the touchless emergency button.

* * * * *